United States Patent
Chen

(10) Patent No.: US 11,193,616 B2
(45) Date of Patent: Dec. 7, 2021

(54) HOSE CONNECTOR

(71) Applicant: SHIN TAI SPURT WATER OF THE GARDEN TOOLS CO., LTD., Chang-Hua Hsien (TW)

(72) Inventor: Chin-Yuan Chen, Chang-Hua Hsien (TW)

(73) Assignee: SHIN TAI SPURT WATER OF THE GARDEN TOOLS CO., LTD., Chang-Hua Hsien (TW)

( * ) Notice: Subject to any disclaimer, the term of this patent is extended or adjusted under 35 U.S.C. 154(b) by 412 days.

(21) Appl. No.: 16/401,197

(22) Filed: May 2, 2019

(65) Prior Publication Data

US 2020/0347974 A1 Nov. 5, 2020

(51) Int. Cl.
| | |
|---|---|
| *F16L 27/08* | (2006.01) |
| *F16L 33/24* | (2006.01) |
| *F16L 33/22* | (2006.01) |
| *B05B 9/01* | (2006.01) |
| *B05B 15/658* | (2018.01) |
| *B05B 15/65* | (2018.01) |

(52) U.S. Cl.
CPC ............. *F16L 33/24* (2013.01); *B05B 15/65* (2018.02); *B05B 9/01* (2013.01); *B05B 15/658* (2018.02); *F16L 27/0804* (2013.01); *F16L 27/0816* (2013.01); *F16L 33/223* (2013.01)

(58) Field of Classification Search
CPC ... F16L 33/24; F16L 19/0212; F16L 19/0218; F16L 33/20; F16L 33/18; F16L 33/22; F16L 19/0231; F16L 19/025; F16L 27/0816; F16L 33/223; F16L 33/32; F16L 27/08; F16L 27/082; F16L 27/0804; B05B 9/01; B05B 15/652; B05B 15/654; B05B 15/68; B05B 15/63
USPC ... 285/425, 5, 353, 354, 355, 357, 336, 379, 285/385, 389, 388, 387, 238, 282
See application file for complete search history.

(56) References Cited

U.S. PATENT DOCUMENTS

| | | | | |
|---|---|---|---|---|
| 2006/0273585 | A1* | 12/2006 | Chung | ........................ 285/354 |
| 2007/0075541 | A1* | 4/2007 | Wu | ................... F16L 27/0816 |
| 2011/0057435 | A1* | 3/2011 | Tong | ................... F16L 33/223 |
| | | | | 285/5 |

FOREIGN PATENT DOCUMENTS

EP 2327841 A1 * 6/2011 .......... F16L 27/0804

* cited by examiner

*Primary Examiner* — Matthew Troutman
*Assistant Examiner* — William S. Choi

(57) ABSTRACT

A hose connector has: a cap, a connecting pipe and an assembly pipe. The cap has an inner ring and an outer ring, and the inner ring is provided with an inner threaded hole. The cap further has a socket hole connected with the inner threaded hole, the outer ring is provided with an outer threaded section. The connecting pipe has an inserting portion at one end and a first threaded portion at another end. The inserting portion has a neck section and a stopping ring. The inserting portion is disposed in the socket hole of the cap. The stopping ring comprises at least one protrusion facing the groove. The assembly pipe has a through hole and a convex ring at one end and a second threaded portion at another end. The second threaded portion of the assembly pipe engages with the inner threaded hole of the cap.

7 Claims, 6 Drawing Sheets

HOSE CONNECTOR

BACKGROUND OF INVENTION

1. Field of Invention

The present invention relates to a hose connector, and more particularly to a rotatable hose connector.

2. Description of the Related Art

Currently, there are two conventional types of connection joints which are applied to the spray head. One type is that there is no movable rotation between the two ends of the joint, and it is simply used to connect the water pipe and the spray head, and the user is in use. Because the water spray needs to be operated in different directions or angles, the spray head will have a rotating or twisting force on the water pipe, and the external force will cause the water pipe to be twisted or wound, so the knotting of the water pipe often occurs, which increases the water pressure inside the water pipe due to the resistance caused by the knotting and winding. Therefore, the water pipe can easily burst or the water pipe can be separated from the water supply source by itself, and it can also cause the connection joint to be loose and damaged. The other type is that the connection joint can rotate between the two ends of the water pipe. The connector utilizes three or more tubes to be connected to each other, and a plurality of steel balls are arranged between the tubes to allow rotation between the two ends of the connector. However, it is not difficult to find out that the above-mentioned conventional structure has some shortcomings. The components of the connector are too many to be assembled, and the risk of water leakage and jam is increased. Furthermore, the length of the connector is directly added onto the spray head, so that the total length of the spray head is increased, which increases the inconvenience of the movement of the spray head during the operation. If the size of the connector is simply reduced, the production cost and the dimensional fit will increase.

Therefore, it is desirable to provide a rotatable hose connector to mitigate and/or obviate the aforementioned problems.

SUMMARY OF THE INVENTION

An objective of present invention is to provide a hose connector, which is capable of improving the above-mention problems.

In order to achieve the above mentioned objective, a hose connector has: a cap, a connecting pipe and an assembly pipe. The cap has an inner ring and an outer ring, and the inner ring is provided with an inner threaded hole. The cap further has a socket hole connected with the inner threaded hole, the outer ring is provided with an outer threaded section. The connecting pipe has an inserting portion at one end and a first threaded portion at another end. The inserting portion has a neck section and a stopping ring. The inserting portion is disposed in the socket hole of the cap. The stopping ring comprises at least one protrusion facing the groove. The assembly pipe has a through hole and a convex ring at one end and a second threaded portion at another end. The second threaded portion of the assembly pipe engages with the inner threaded hole of the cap.

Other objects, advantages, and novel features of invention will become more apparent from the following detailed description when taken in conjunction with the accompanying drawings.

DETAILED DESCRIPTION OF THE PREFERRED EMBODIMENT

Figure 1:
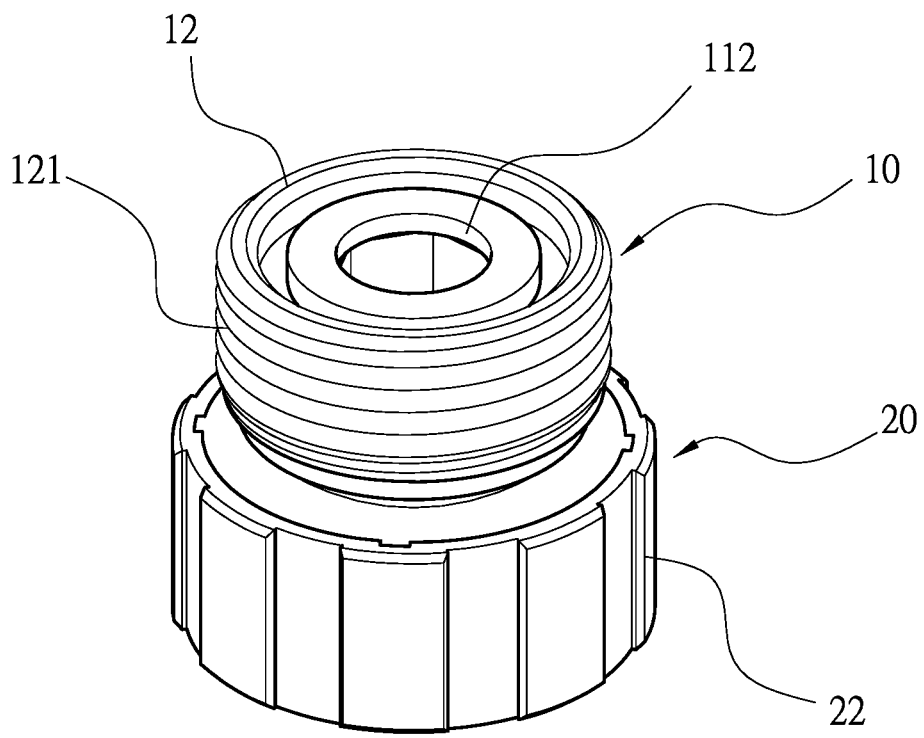
FIG. 1 is a perspective view of a preferred embodiment according to the present invention.
Figure 2:
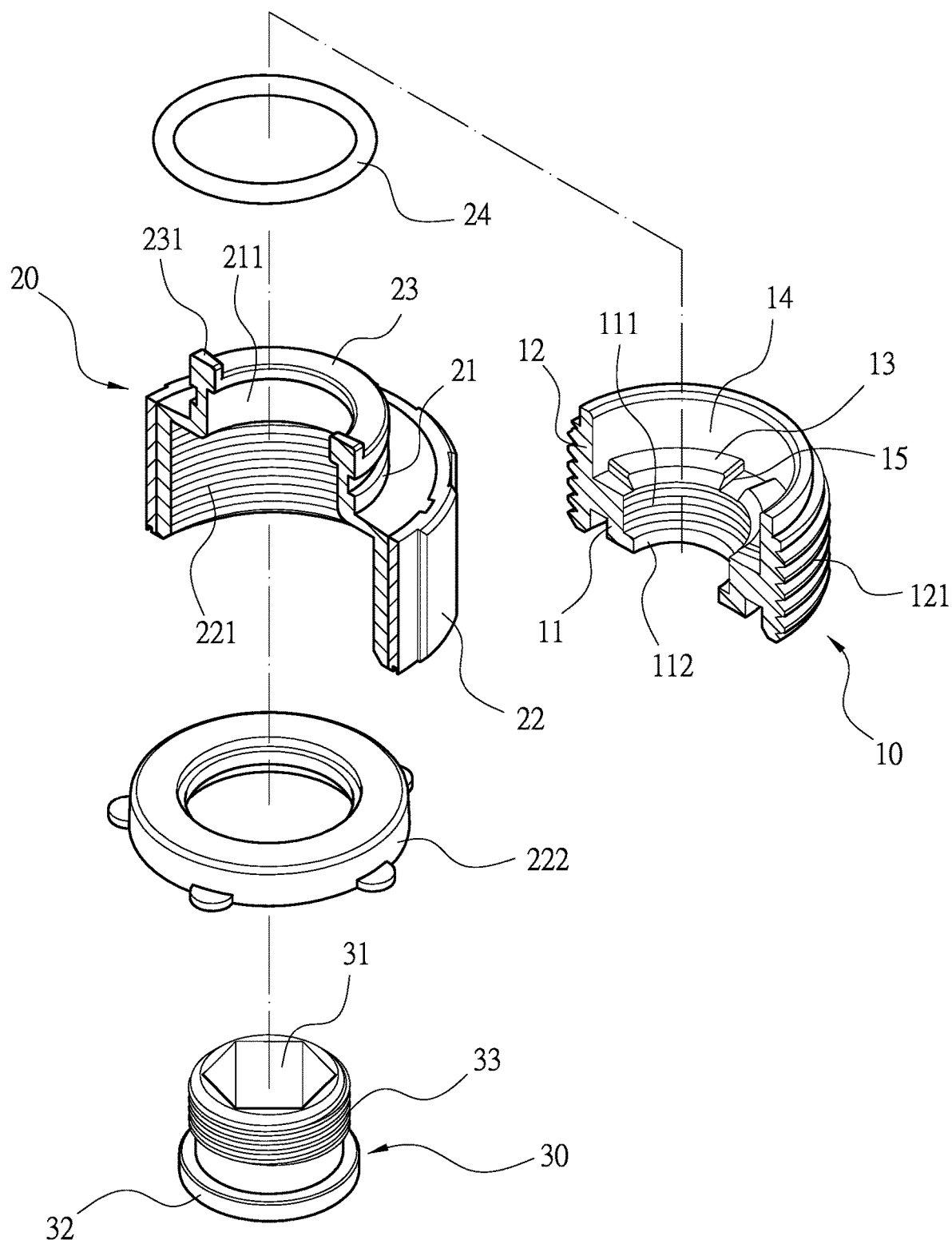
FIG. 2 is an exploded view of the preferred embodiment according to the present invention.
Figure 3:
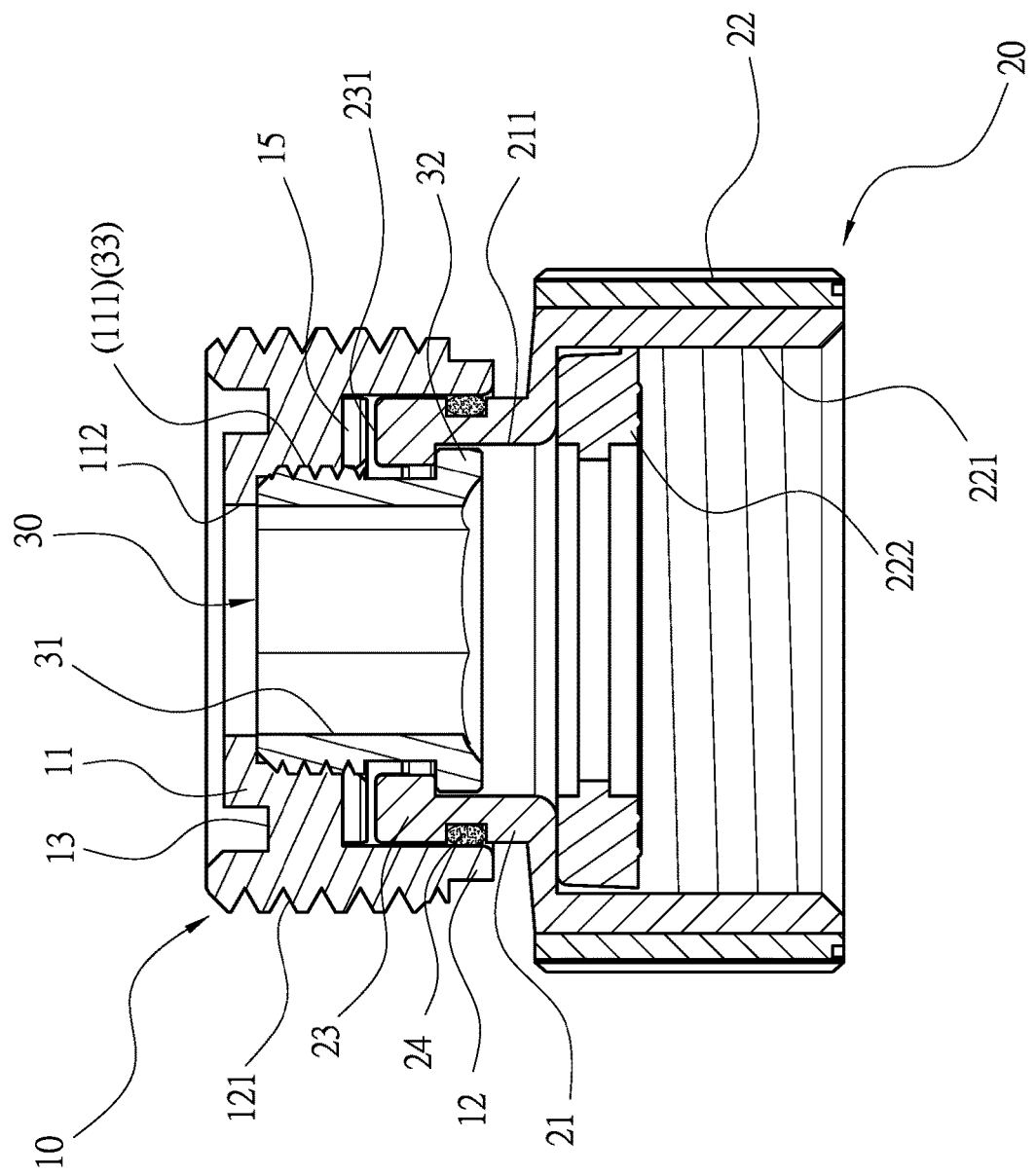
FIG. 3 is a cross-sectional view of the preferred embodiment according to the present invention.
Figure 4:
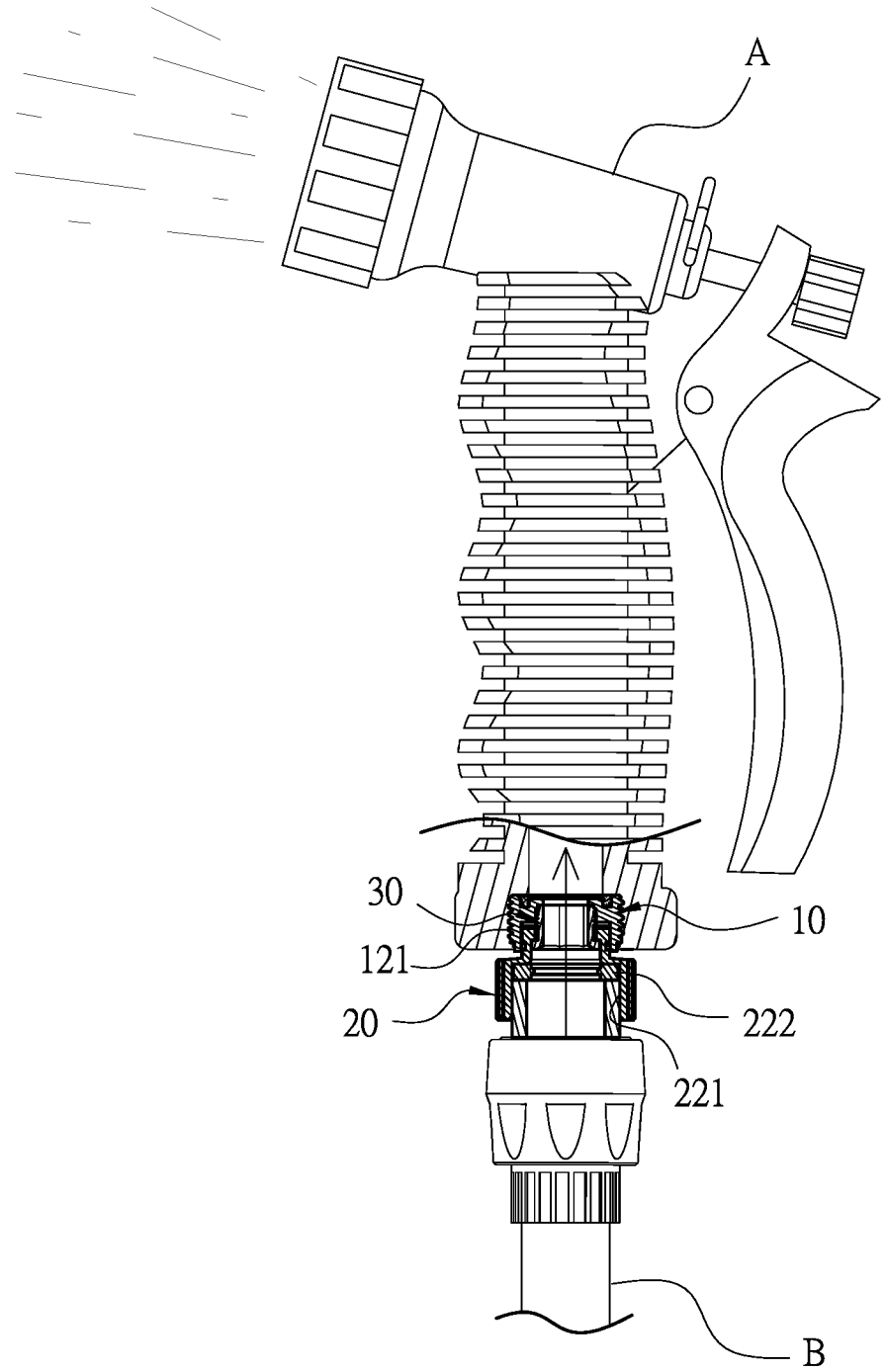
FIG. 4 is a schematic diagram of the state of use of the preferred embodiment according to the present invention.
Figure 5:
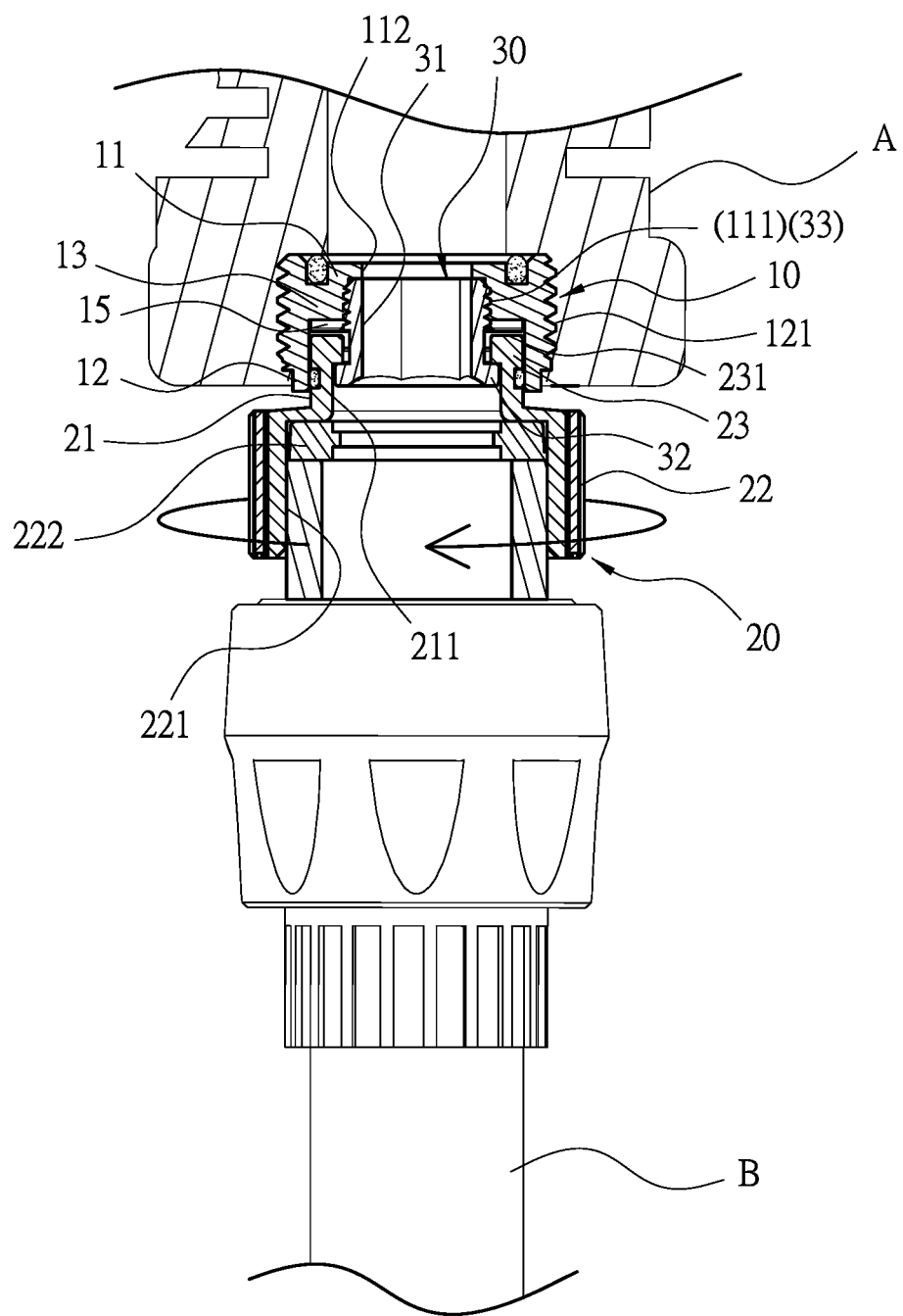
FIG. 5 is a schematic diagram of the rotation action of the preferred embodiment according to the present invention.

Please refer to FIGS. 1-3. A hose connector comprises: a cap 10, a connecting pipe 20 and an assembly pipe 30. The cap 10 has an inner ring 11 and an outer ring 12 connected by a dividing lip 13. The inner ring 11 is provided with an inner threaded hole 111. The cap 10 further has a socket hole 14 connected with the inner threaded hole 111. The outer ring 12 is provided with an outer threaded section 121, and the dividing lip 13 is further provided with a plurality of grooves 15 facing the socket hole 14. The inner ring 11 further comprises a tapered blocking portion 112 at one end opposite the socket hole 14, for stopping the assembly pipe 30. The connecting pipe 20 has an inserting portion 21 at one end and a first threaded portion 22 at another end. The inserting portion 21 comprises a neck section 211, and an end of the inserting portion 21 further comprises a stopping ring 23. The inserting portion 21 is disposed in the socket hole 14 of the cap 10. The inserting portion 21 is jacketed with a sealing ring 24, and the sealing ring 24 pushes against the inside of the socket hole 14 of the cap 10. The stopping ring 23 comprises at least one protrusion 231 facing the groove 15. The first threaded portion 22 of the connecting pipe 20 comprises a screw hole 221, and the screw hole 221 is connected to the neck section 211 and configured to connect to a hose B. The screw hole 221 further comprises a sealing washer 222 for providing sealing effect between the connecting pipe 20 and the hose B. The assembly pipe 30 has a hexagonal through hole 31 and a convex ring at 32 one end and a second threaded portion 33 at another end. The assembly pipe 30 is disposed in the neck section 211 of the connecting pipe 20, and the second threaded portion 33 of the assembly pipe 30 engaging with the inner threaded hole 111 of the cap 10 such that the convex ring 32 abuts against the stopping ring 23 of the connecting pipe 20 to allow the connecting pipe 20 and the cap 10 to be rotate relatively.

Figures 6, 7:
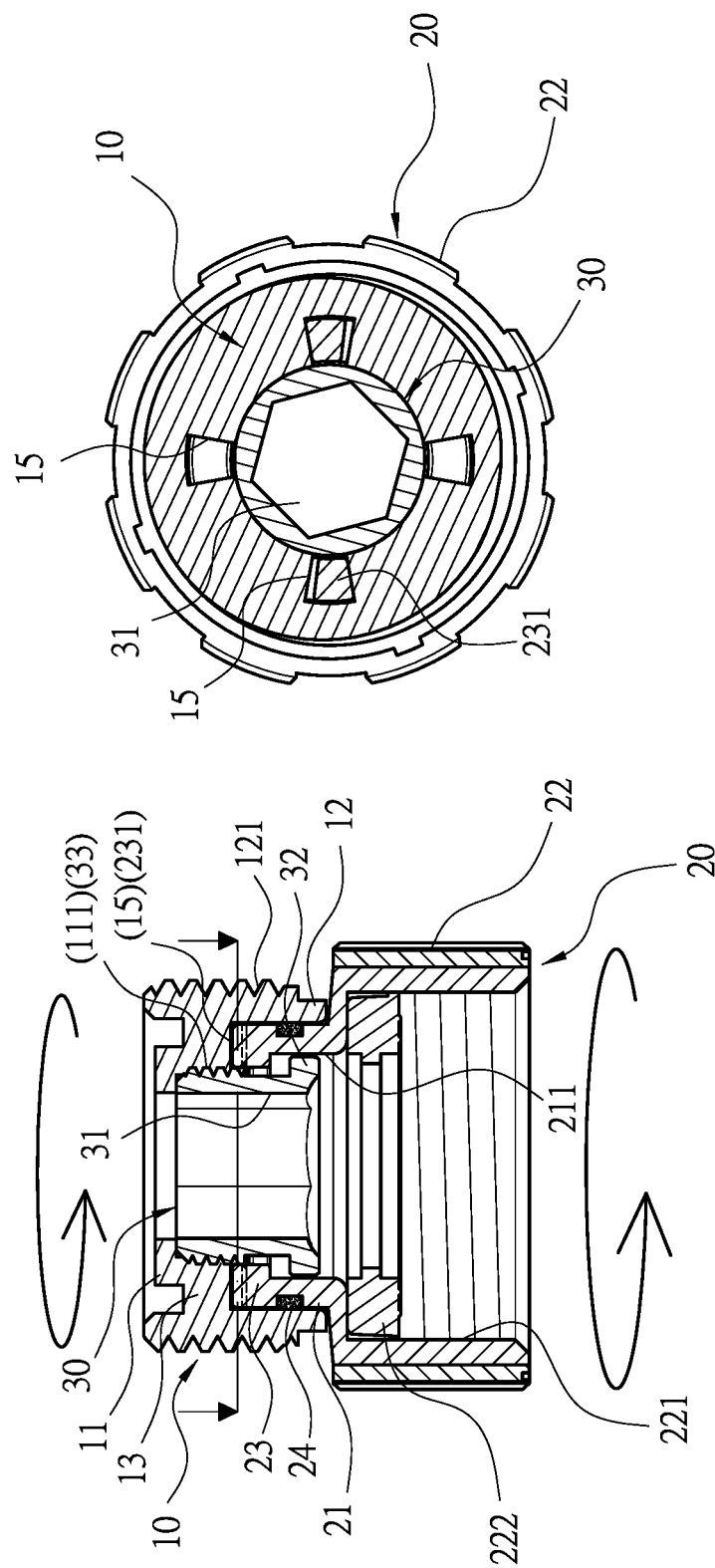
FIG. 6 is a schematic diagram of the connecting pipe and the cap of the preferred embodiment according to the present invention.
FIG. 7 is another schematic diagram of the connecting pipe and the cap of the preferred embodiment according to the present invention.

The effect of the actual use, as shown in FIGS. 2, 3, 4, and 5. The connecting pipe 20 is provided with the sealing ring 24 at the inserting portion 21, and the inserting portion 21 of the connecting pipe 20 is inserted into the socket hole 14 of the cap 10 such that the sealing ring 24 is in contact with the inner wall of the socket hole 14 of the cap 10. Furthermore, the protrusion 231 of the stopping ring 23 faces the groove 15 of the cap 10, and the assembly pipe 30 is placed in the neck section 211 of the connecting pipe 20 and locked to the inner threaded hole 111 of the cap 10 by the second threaded portion 33 of the assembly pipe 30. The convex ring 32 of the assembly pipe 30 blocks the stopping ring 23 of the connecting pipe 20, which prevents the connecting pipe 20 from coming off the cap 10 and forming the connection among the cap 10, the connecting pipe 20 and the assembly pipe 30. The outer threaded section 121 of the ring 12 of the cap 10 is locked with the spray head A, and the screw hole 221 of the first threaded portion 22 of the connecting pipe 20 is locked with the water hose B. When water is turned on, the water flow enters into the spray head A via the connecting pipe 20, the assembly pipe 30 and the cap 10 in sequence. When the water spray action causes the spray head A and the water hose B to rotate or twist with each other, the connecting pipe 23 of the connecting pipe 20 is only blocked by the convex ring 32 of the assembly pipe 30, so the connecting pipe 20 is still able to rotate along the convex ring 32. Therefore, the rotation or swing of the spray head A will not drive the water hose B, thereby preventing the occurrence of twisting or winding between the spray head A and the water hose B. For another effect of the present invention, please refer to in FIGS. 6 and 7. Since the cap 10 is fixed onto the spray head A by the outer threaded section 121 in conceal, between the spray head A and the water hose B, only the first threaded portion 22 of the connecting pipe 20 is exposed, the connection length can be shortened to make the spray head A easier to operate. Moreover, when it is needed to disassemble the cap 10, the user can hold the first threaded portion 22 to force the connecting pipe 20 to push the cap 10 in a rotational manner, so that the protruding 231 of the connecting pipe 20 is embedded in the groove 15 of the cap 10 to detach the cap 10, which reduces the volume of the spray head A and the difficulty of disassembly.

Although the present invention has been explained in relation to its preferred embodiment, it is to be understood that many other possible modifications and variations can be made without departing from the spirit and scope of invention as hereinafter claimed.

What is claimed is:

1. A hose connector comprising:
   a cap having an inner ring and an outer ring connected by a dividing lip, the inner ring provided with an inner threaded hole, the cap further having a socket hole connected with the inner threaded hole, the outer ring provided with an outer threaded section, the dividing lip further provided with a plurality of grooves facing the socket hole;
   a connecting pipe having an inserting portion at one end and a first threaded portion at another end, the inserting portion comprising a neck section, an end of the inserting portion comprising a stopping ring, the inserting portion disposed in the socket hole of the cap, the stopping ring comprising at least one protrusion facing the groove; and
   an assembly pipe having a through hole and a convex ring at one end and a second threaded portion at another end, the assembly pipe disposed in the neck section of the connecting pipe, and the second threaded portion of the assembly pipe engaging with the inner threaded hole of the cap such that the convex ring abuts against the stopping ring of the connecting pipe.

2. The hose connector as claimed in claim 1, wherein the inner ring further comprises a tapered blocking portion at one end opposite the socket hole, for stopping the assembly pipe.

3. The hose connector as claimed in claim 1, wherein the outer threaded section of the cap is configured to connect to a spray head.

4. The hose connector as claimed in claim 1, wherein the first threaded portion of the connecting pipe comprises a screw hole, and the screw hole is connected to the neck section and configured to connect to a hose.

5. The hose connector as claimed in claim 4, wherein the screw hole further comprises a sealing washer.

6. The hose connector as claimed in claim 1, wherein the inserting portion is jacketed with a sealing ring, and the sealing ring pushes against the inside of the socket hole of the cap.

7. The hose connector as claimed in claim 1, wherein the through hole of the assembly pipe is hexagonal.

* * * * *